United States Patent [19]

Franklin et al.

[11] 4,228,893
[45] Oct. 21, 1980

[54] INHIBITION OF PAINT-PRODUCT SKIN FORMATION ON THE INTERIOR SURFACE OF A PAINT VESSEL LID

[75] Inventors: Kenneth Franklin, Pittsburgh; William S. Rosenthal, Monroeville; S. Thomas Greer, McMurray, all of Pa.

[73] Assignee: PPG Industries, Inc., Pittsburgh, Pa.

[21] Appl. No.: 25,710

[22] Filed: Apr. 2, 1979

[51] Int. Cl.³ ............................................. B65D 81/24
[52] U.S. Cl. .................................... 206/205; 206/219
[58] Field of Search ............ 206/205, 216, 219, 213.1, 206/525, 527

[56] References Cited

U.S. PATENT DOCUMENTS

| | | | |
|---|---|---|---|
| 929,610 | 7/1909 | Lilly | 206/205 |
| 2,465,755 | 3/1949 | Sanders | 206/525 |
| 2,719,660 | 10/1955 | Ellis | 206/213.1 |
| 2,982,396 | 5/1961 | Shihaden | 206/219 |
| 3,261,457 | 7/1966 | Harmon | 206/219 |
| 3,321,070 | 5/1967 | Childs | 206/216 |
| 3,825,111 | 7/1974 | Pipkins | 206/213.1 |

*Primary Examiner*—William T. Dixson, Jr.
*Attorney, Agent, or Firm*—George D. Morris

[57] ABSTRACT

Disclosed is a method to inhibit the formation of a paint-product skin on the interior surface of the lid of a closed upright vessel housing a paint composition wherein a portion of said composition is volatile. The method comprises delivering said paint composition to an upright, open vessel closeable at its top with a lid; delivering a sufficient quantity of a barrier material to the open vessel to provide a covering layer of the barrier material for the top of the paint composition; and closing the open vessel at its top with a lid. The barrier material is characterized as (1) less dense than the paint composition; (2) containing a volatile portion whose volatility is at least substantially equivalent to the volatility of the volatile portion of the paint composition; and (3) sufficiently compatible with the paint composition to become a mixed non-detrimental component thereof upon adequate mixing therewith.

17 Claims, No Drawings

INHIBITION OF PAINT-PRODUCT SKIN FORMATION ON THE INTERIOR SURFACE OF A PAINT VESSEL LID

BACKGROUND OF THE INVENTION

The subject of this invention is a method to inhibit paint-product skin formation on the interior surface of the lid of a closed upright vessel housing a paint composition wherein a portion of said composition is volatile.

Paint compositions generally contain a volatile portion which volatilizes into the atmosphere upon application of the paint composition to a substrate, thereby essentially coating the substrate with the paint composition minus its volatile portion. In latex paint compositions, for example, water is the volatile portion which volatilizes from the composition after application of the paint composition to the substrate. Providing such a paint composition to an ultimate user is generally accomplished by supplying the composition in a closed upright vessel, usually a metal can, having a top lid which is removable to permit access to said vessel. However, when the composition is initially delivered to the vessel, said vessel may not be completely filled in order to allow a later addition of pigment formulations to accommodate ultimate color needs. Further, even when later additions are not contemplated and the vessel is initially completely filled, a settling effect occurs over time to yield a vessel which, likewise, is not completely filled. In either case, therefore, an air space results between the top of the paint composition and the interior surface of the vessel lid.

Normal handling of this vessel during shipment and storage of the paint composition therein can easily initiate the formation of a paint-product skin on the interior surface of the vessel lid. The term "paint-product skin" is herein defined as a coating of the paint composition minus at least a part of the quantity of the originally-present volatile portion of said paint composition. Specifically, tipping or inverting the closed upright vessel from its upright position causes the paint composition in the vessel to contact the interior surface of the lid. Returning the vessel to its upright position results in a coating of the paint composition being retained on this interior surface. The combination of this coating, which is similar in thickness to a normally applied coating in a painting process, on the interior surface of the lid along with the air space discussed above acts to cause a paint-product skin to form on the interior surface of the lid since at least a part of the volatile portion of the paint composition volatilizes into the air space. In particular, if the paint composition is a latex base containing water, this water tends to volatilize from the coating on the interior surface of the lid and into the air space. When water migrates in this manner from the coating, a paint-product skin forms on the interior surface, said skin ranging from a hard, dry film to a soft gelatinous layer. This paint-product skin can later break loose and fall into the paint composition, causing lumps, grit and the like in the composition which will cause surface irregularities and constitute a form of seeding when the composition is applied to a substrate to be coated.

It is therefore an object of the instant invention to inhibit paint-product skin formation on the interior surface of the lid of a closed upright vessel housing a paint composition wherein a portion of said composition is volatile, thereby eliminating seeding and consequent irregularities upon application of the composition to a substrate. It is a further object of the invention to conveniently inhibit said skin formation from a paint composition wherein the volatile portion of the composition is water as in a latex paint composition. These and other objects will become apparent within the body of this application.

SUMMARY OF THE INVENTION

The subject of the invention disclosed and claimed herein is a method to inhibit the formation of a paint-product skin on the interior surface of a lid of a closed upright vessel housing a paint composition wherein a portion of said composition is volatile, the method comprising:

a. delivering said paint composition to an upright open vessel closeable at its top with a lid;

b. delivering a sufficient quantity of a barrier material to the open vessel to provide a covering layer of the barrier material for the top of the paint composition, said barrier material being characterized as
1. less dense than the paint composition;
2. containing a volatile portion whose volatility is at least substantially equivalent to the volatility of the volatile portion of the paint composition;
3. sufficiently compatible with the paint composition to produce no detrimental effects therein and to become a mixed non-detrimental component thereof upon adequate mixing therewith; and
4. more viscous than the paint composition; and c. closing the open vessel at its top with a lid.

Delivery of the barrier material can be accomplished prior to, simultaneously with, or after delivery of the paint composition to the vessel. Preferably, the barrier material is delivered after composition delivery to the vessel is completed. Composition delivery as well as barrier material delivery can be accomplished by hand, or can be accomplished by the addition of a barrier-material delivery means to apparatus already appropriate for vessel filling, all as known in the art. Vessels employed to house the paint composition and the barrier material can be constructed of any material suitable for containment of the paint composition, and include metal cans whose interior surfaces may or may not be pretreated, all as known in the art. The lid of the vessel should securely close the vessel.

Any compound, composition, or the like whose properties, which would be recognized by a skilled artisan, meet the above-described characteristics of the barrier material can be employed as said barrier material. As recited above, a sufficient quantity of the barrier material must be delivered to the vessel so that the entire top of the paint composition in the vessel is covered with a layer of said material. The barrier material must not effect seeding at its interface with the paint composition. Preferably, thickness of the layer should be from about one inch (2.54 centimeters) to about three inches (7.62 centimeters). However, it is to be understood that a lesser or greater thickness can be employed, depending on particular requirements of a particular paint composition and/or anticipated handling of the vessel. The barrier material must, of course, be less dense than the paint composition to permit said barrier material to float on the top of the composition. Additionally, to reduce the possibility of premature mixing of the barrier material with the paint composition during normal shipping and handling of the vessel, the barrier material can be, and is preferably, more viscous than the paint composition to thereby preserve a layer configuration. Conversely, however, the viscosity should not be so great to prevent mixing with the paint when such mixing is desired and physically performed as with a commercial agitator mixer commonly employed in the preparation for delivery of a paint composition to an ultimate user. In regard to mixing the barrier material with the paint composition, the barrier material must be compatible with the several components comprising the paint composition to yield a final paint composition upon mixing wherein the barrier material becomes a mixed component thereof and does not produce a detrimental effect to the utility of the paint composition.

As earlier related, in prior art packaging an air space is present between the interior surface of the lid of a closed upright vessel and the top of the paint composition within the vessel. It is into this air space that at least a part of the volatile portion of the paint composition volatilizes, leaving a paint-product skin on the interior surface of the lid. In employing the method of the instant invention, an air space is also present in the closed upright vessel, said air space being situated between the interior surface of the vessel's lid and the top of the barrier material. However, on tipping or inverting said vessel, the barrier material comes into contact with the interior surface of the lid and coats this surface before the paint composition can reach said surface. Subsequent return of the vessel to its upright position results in the retention of a coating of barrier material on the interior surface of the lid followed by a coating of the paint composition on said barrier material. This resulting double coating, consisting of barrier material and paint composition, has a combined volatile portion whose magnitude, despite some volatilization thereof into the air space, will not go below the originally present quantity of volatile portion of the paint composition alone, thereby having the effect of enriching the volatile portion of the paint composition coating. In such manner, inhibition of paint-product skin formation on the interior of the lid is accomplished.

In the following Examples all parts and percentages are by weight unless otherwise specified.

EXAMPLE 1

The following water base latex paint was prepared in two parts.

Part I 1.8 pounds (816.5 g) of hydroxyethyl cellulose (250 MR type, Hercules Co.) and 3.0 pounds (1.36 kg) of colloidal magnesium aluminum silicate were mixed with 14.0 pounds (6.35 kg) of Texanol ® [$(CH_3)_2CHCO_2CH_2C$ $(CH_3)_2CHOHCH(CH_3)_2$, Eastman Co.] and 120.0 pounds (54.43 kg) of water. To this mixture 0.75 pound (340.2 g) of 2 amino-2-methyl propanol and 0.25 pound (113.4 g) of phenyl mercuric acetate were added, the former for pH adjustment and the latter for preservative qualities. 5.00 pounds (2.27 kg) wetting agent [Tamol 731 ® (sodium salt of polymeric carboxylic acid) Rohm & Hass Co.], 3.0 pounds (1.36 kg) oil-in-water emulsifier [Triton X-100 ®, Rohm & Hass Co.], and 2.0 pounds (907.2g) of defoamer [Foamaster S ®, Nopco Co.] were then added. The next addition included 10.0 pounds (4.54 kg) of a high-boiling mineral spirit and 1.0 pound (453.6 g) medium HLB (hydrophilic lyophilic balance) emulsifier (Triton X-45 ®, Rohm & Haas). Finally, 10.0 pounds (4.54 kg) of calcium silicate (Hi-Sil 422 ®, PPG Industries, Inc.), 25.0 pounds (11.34 kg) of diatomaceous silica (Celite 499 ®, Johns-Mansville Co.), and 40.0 pounds (18.14 kg) of amorphous silica (Imsil A-25 ®, Illinois Minerals Co.) were added. The entire mixture was then thoroughly ground on a high speed disperser to produce a smooth paste. After grinding, the paste was reduced with 42.82 pounds (19.42 kg) of water and pumped into a tank containing the composition of Part II.

Part II 310.0 pounds (140.62 kg) of vinyl acrylic emulsion (UCAR 362 ®, Union Carbide Corp.) containing 55 percent solids was combined with 4.0 pounds (1.81 kg) of defoamer (Foamaster S ®, Nopco Co.), 73.0 pounds (33.11 kg) of aluminum silicate slurry at 68 percent solids, and 328.0 pounds (148.78 kg) of rutile titanium dioxide slurry at 62 percent solids. After the combination of Parts I and II, 118 ounces (3.49 l) of the resulting paint composition was delivered to a cylindrically-shaped gallon container and held for addition of a barrier material.

A barrier material was prepared by combining 1.8 pounds (816.5 g) of hydroxyethyl cellulose (250 MR type, Hercules Co.), 75.0 pounds (34.02 kg) of water, 10 pounds (4.54 kg) of ethylene glycol, and 1.0 pound (453.6 g) of wetting agent (Tamol 731 ®, Rohm & Haas Co.). To this mixture was added 0.75 pound (340.2 g) of 2-amino-2-methyl propanol and 0.25 pound (113.4 g) of phenyl mercuric acetate. The former acts to remove an apparent coating from the hydroxeythyl cellulose surface, while the latter is a preservative. As is apparent, water is the volatile portion of the barrier material, and, likewise, the volatile portion of the paint composition. The barrier material has a density less than and a viscosity greater than the paint composition. Ten liquid ounces (295.7 ml), producing a thickness of about one inch (2.54 cm) in the above-identified gallon container, of the barrier material was delivered to the gallon container already housing the paint composition to cover said composition, a tight-fitting lid was placed on the container, and the container was subjected to the following testing procedure.

A series of five cycles representing temperature and storage extremes included, per cycle, rolling the container approximately 12 feet (3.66 m), placing the container in a 140° F. room for 18 hours, and finally placing said container in a 40° F. room for 6 hours. At the completion of each of the cycles the container lid was examined for skinning. In an identical container a control paint composition, being the same contents of the barrier-containing container but with the barrier material thoroughly mixed therein, was subjected to the same cyclic testing procedure. The control container had paint-product skin formation on the interior surface of the lid after one cycle; the container housing the paint composition with covering barrier material exhibited no paint-product skin formation throughout the five complete cycles. Upon completion of the five cycles, the container housing the paint composition with barrier material was shaken sufficiently to mix the barrier material with the composition. The resulting mixture remained mixed and was applied to a workpiece with no detrimental effects.

EXAMPLE 2

A second water-base latex paint was prepared in two parts, as follows:

Part I 3.0 pounds (1.36 kg) of colloidal magnesium silicate and 2.0 pounds (907.2 g) of defoamer (Foamaster S ®, Nopco Co.) were mixed with 144.30 pounds (65.46 kg) of water. To this mixture was added 6.0 pounds (2.72 kg) of wetting agent (Tamol 731 ®, Rohm & Haas Co.), 3.0 pounds (1.36kg) of oil-in-water emulsifier (Igepal CA-630 ®, GAF Co.), 14.0 pounds (6.35 kg) of Texanol ® [CHCO$_2$CH$_2$C(CH$_3$)$_2$ CHOHCH(CH$_3$)$_2$, Eastman Co.], 0.5 pound (226.8 g) phenyl mercuric acetate (preservative), and 0.75 pound (340.2 g) 2-amino-2-methyl propanol (pH adjuster). To this mixture was added 10.0 pounds (4.54 kg) of a high boiling mineral spirit along with 1.0 pound (453.6 g) of medium HLB emulsifier (Triton X-45 ®, Rohm & Haas Co.). Finally, 10.0 pounds (4.54 kg) of calcium silicate (Hi-Sil 422 ®, PPG industries, Inc.), 25.0 pounds (11.34 kg) of diatomaceous silica (Celite 499 ®, Johns-Manville), 220.0 pounds (99.79 kg) titanium dioxide (R-931 type, DuPont Co.), 50.0 pounds (22.68 kg) aluminum silicate (Al-Sil-Ate NC ®, Freeport Co.), and 40.0 pounds (18.14 kg) of amorphous silica (Imsil A-25 ®, Illinois Minerals Co.) were added. The entire mixture was thoroughly ground on a high speed disperser to produce a smooth paste which was reduced with 60.0 pounds (27.22 kg) of water and pumped to a tank containing the composition of Part II.

Part II 310.0 pounds (140.62 kg) of vinyl acrylic emulsion (UCAR 362 ®, Union Carbide Corp.) containing 55 percent solids was combined with 4.0 pounds (1.81 kg) defoamer (Foamaster S ®, Nopco Co.) 1.5 pounds (680.4 g) phenyl mercuric acetate (preservative), and 0.75 pound (340.2 g) 2-amino-2-methyl propanol (ph adjuster). 98.8 liquid ounces (2.92 l) of the resulting paint composition was delivered to a cylindrically-shaped gallon container and held for addition of a barrier material.

A barrier material was prepared by combining 4.75 pounds (2.16 kg) of a cellulose modified montmorillionite clay having a density of 1.8 gm/cm$^3$ and readily dispersible under high shear conditions at 75° F. (available as Bentone LT ®, NL Industries, Inc., Hightstown, N.J.; described in NL Industries Product Description DS-174) with 185.25 pounds (84.03 kg) of water. As is apparent, water, the volatile portion of the barrier material, comprises 97+ percent of said barrier material. Likewise, water is the volatile portion of the paint composition. The barrier material has a density less than and a viscosity greater than the paint composition.

29.2 liquid ounces (863.4 ml), producing a thickness of about 3 inches (7.62 cm) in the above-identified gallon container, of the barrier material was delivered to the gallon container already housing the paint composition to cover said composition, a tight-fitting lid was placed on the container, and the container was subjected to the five cycles described in Example 1. In an identical container a control paint composition, being the same contents of the barrier-containing container of this Example but with the barrier material thoroughly mixed therein, was subjected to the same cyclic testing procedure. The control container had paint-product skin formation on the interior surface of the lid after one cycle; the container housing the paint composition with covering barrier material exhibited no paint-product skin formation throughout the five complete cycles. As in Example 1, after the five cycles were completed, the container housing the paint composition and barrier material was shaken to mix the barrier material with the composition. The resulting mixture remained mixed and was applied without detrimental effects to a workpiece.

Thus, the employment of a barrier material as herein described and claimed successfully inhibits paint-product skin formation on the interior surface of the lid of a vessel housing a paint composition. As is evident herein, the components of the barrier material can be those which are normally present in a usable paint composition. However, instead of blending all components in the manufacturing process, an appropriate portion of components which meet the physical criteria set forth herein for the barrier material can be initially withheld during initial blending of the paint composition. These components so withheld can then function as the barrier material when utilized as herein described.

What is claimed is:

1. A method to inhibit the formation of a paint-product skin on the interior surface of the lid of a closed upright vessel housing a paint composition wherein a portion of said composition is volatile, the method comprising:
   a. delivering said paint composition to an upright open vessel closeable at its top with a lid;
   b. delivering a sufficient quantity of a barrier material to the open vessel to provide a covering layer of the barrier material for the top of the paint composition, said barrier material being characterized as
      1. less dense than the paint composition:
      2. containing a volatile portion whose volatility is at least substantially equivalent to the volatility of the volatile portion of the paint composition;
      3. sufficiently compatible with the paint composition to produce no detrimental effects therein and to become a mixed non-detrimental component thereof upon adequate mixing therewith; and
      4. more viscous than the paint composition; and
   c. closing the open vessel at its top with a lid.

2. A method as claimed in claim 1 wherein the quantity of barrier material delivered provides a covering layer of barrier material from about one inch (2.54 cm) to about three inches (7.62 cm) thick.

3. A method as claimed in claim 1 wherein delivery of the barrier material is performed after delivery of the paint composition.

4. A method as claimed in claim 1 wherein the paint composition is a latex paint composition.

5. A method as claimed in claim 4 wherein the volatile component of the barrier material is water.

6. A method as claimed in claim 5 wherein the water portion of the barrier material is present in an amount of from about 97 percent to about 98 percent by weight.

7. A method as claimed in claim 4 wherein the barrier material comprises an aqueous cellulose modified montmorillionite clay composition.

8. A method as claimed in claim 4 wherein the barrier material comprises an aqueous solution of hydroxy ethyl cellulose and ethylene glycol.

9. A method as claimed in claim 8 wherein the aqueous solution contains a wetting agent and a preservative.

10. A lidded vessel containing a partially volatile paint composition and a layer of barrier material, said layer being disposed between the lid of the vessel and the top of the paint composition and covering said paint composition, the barrier material being characterized as
   1. less dense than the paint composition;

2. containing a volatile portion whose volatility is at least substantially equivalent to the volatility of the volatile portion of the paint composition;
3. sufficiently compatible with the paint composition to produce no detrimental effects therein and to become a mixed non-detrimental component thereof upon adequate mixing therewith; and
4. more viscous than the paint composition.

11. The vessel as claimed in claim 10 wherein the layer of barrier material is from about one inch (2.54 cm) to about three inches (7.62 cm) thick.

12. The vessel as claimed in claim 10 wherein the paint composition is a latex paint composition.

13. The vessel as claimed in claim 12 wherein the volatile component of the barrier material is water.

14. The vessel as claimed in claim 13 wherein the water portion of the barrier material is present in an amount of from about 97 percent to about 98 percent by weight.

15. The vessel as claimed in claim 12 wherein the barrier material comprises an aqueous cellulose modified montmorillionite clay composition.

16. The vessel as claimed in claim 12 wherein the barrier material comprises an aqueous solution of hydroxy ethyl cellulose and ethylene glycol.

17. The vessel as claimed in claim 16 wherein the aqueous solution contains a wetting agent and a preservative.

* * * * *